United States Patent

Younessi et al.

[11] Patent Number: 5,619,112
[45] Date of Patent: Apr. 8, 1997

[54] BI-DIRECTIONAL ELECTRIC TORQUE MOTOR AND DRIVER

[75] Inventors: Ramin Younessi, Tigard, Oreg.; Brian Houghton, Fort Collins, Colo.

[73] Assignee: Woodward Governor Company, Fort Collins, Colo.

[21] Appl. No.: 386,275

[22] Filed: Feb. 9, 1995

(Under 37 CFR 1.47)

[51] Int. Cl.$^6$ ........................................................ H02P 7/06
[52] U.S. Cl. ........................ 318/689; 318/684; 318/436; 318/499
[58] Field of Search ...................... 318/684, 689, 318/432, 436, 467, 499, 549; 310/15, 36, 37, 254; 123/188.1

[56] References Cited

U.S. PATENT DOCUMENTS

| | | | |
|---|---|---|---|
| 2,032,658 | 3/1936 | Gille | 172/239 |
| 2,261,087 | 10/1941 | Jones | 172/179 |
| 2,454,107 | 11/1948 | Wald | 318/28 |
| 3,422,326 | 1/1969 | White et al. | 318/18 |
| 3,686,557 | 8/1972 | Futamura | 318/599 |
| 4,059,790 | 11/1977 | Kennel | 318/689 |
| 4,288,730 | 9/1981 | Graham | 318/599 |
| 4,464,895 | 8/1984 | Morrison et al. | 60/39.141 |
| 4,510,403 | 4/1985 | Vanderlaan et al. | 310/36 |
| 4,535,263 | 8/1985 | Avery | 310/112 |
| 4,596,970 | 6/1986 | Vanderlaan et al. | 335/229 |
| 4,631,430 | 12/1986 | Aubrecht | 310/12 |
| 4,642,539 | 2/1987 | Hinds | 318/439 |
| 4,746,843 | 5/1988 | Taenzer | 318/138 |
| 4,754,690 | 7/1988 | Louis et al. | 91/51 |
| 4,768,555 | 9/1988 | Abel | 137/627.5 |
| 4,816,707 | 3/1989 | Vanderlaan | 310/36 |
| 4,877,187 | 10/1989 | Daly | 239/89 |
| 4,888,540 | 12/1989 | Terpstra et al. | 318/689 |
| 4,903,578 | 2/1990 | Terp | 91/499 |
| 4,968,909 | 11/1990 | Hulsing, II | 310/17 |
| 5,004,940 | 4/1991 | Vanderlaan | 310/36 |
| 5,070,289 | 12/1991 | Pona, jr. | 318/640 |
| 5,070,292 | 12/1991 | Goff | 318/811 |
| 5,072,578 | 12/1991 | Moore, Jr. | 60/39.281 |
| 5,233,252 | 8/1993 | Denk | 310/254 |

Primary Examiner—Bentsu Ro
Attorney, Agent, or Firm—Leydig, Voit & Mayer, Ltd.

[57] ABSTRACT

A limited angle torque motor and control circuit are adapted to convert an electrical demand signal of varying magnitude into a motor shaft position relating to the magnitude of the demand signal. More particularly, a bidirectional motor is provided having two stator coils wound in phase opposition, so that the torques produced by the currents in the opposedly wound coils are summed such that the coil having the greater current controls the direction of rotor rotation. A position sensor provides feedback of the present shaft position; the magnitude of the feedback signal being indicative of motor shaft position. Finally, an electronic control circuit which is responsive to both the demand signal and the shaft position signal is provided and has two outputs for simultaneously driving the current in each respective stator coil. A summing means is included in the control circuit for combining the shaft position signal and demand signal so as to produce an error signal. The error signal, in turn, is input to a modulator that creates a differential between the two control circuit outputs to drive the two stator coil currents, thereby causing the motor shaft to rotate toward the desired shaft position.

21 Claims, 5 Drawing Sheets

BI-DIRECTIONAL ELECTRIC TORQUE MOTOR AND DRIVER

BACKGROUND OF THE INVENTION

1. Field of the Art

The present invention relates to control of electrical actuators, and more particularly to the control of limited angle electric torque motors.

2. Discussion of the Related Art

Limited angle torque motors are known and used for a variety of applications, including engine speed control. In this application, a limited angle torque motor may be used, for example, to control the operation of a fuel valve. The motor may be coupled to the fuel valve so that controlled rotation of the motor shaft through a given angle translates a controlled movement to the fuel valve, between fully closed and fully open positions. As greater engine speed is desired, the angular position of the motor is controlled to further open the fuel valve, limited by a maximum speed, fully open valve position. Likewise, when a decrease in engine speed is desired, the motor is controlled to move the fuel valve toward its closed position.

In this and similar applications, precision control of the motor is required in order to achieve satisfactory operation of a controlled device (fuel valve in the foregoing example). A variety of motors and controllers are presently known to provide controlled operation of control devices in applications such as the above-described speed control application. However, various shortcomings are known to persist in the approaches presently known.

For example, mechanically operated torque motors are known to be used in applications for controlling bidirectional movement of a controlled device. In these motors, a mechanical return, such as a spring, is used to urge the motor shaft in one direction toward a fixed or limit position, while electrically operative motor torque is used to actively drive the motor shaft in the opposite direction toward a second fixed or limit position. By way of illustration, a spring may be disposed to motivate a fuel valve to its closed position, while the motor actively drives the valve toward its fully open position. When the mechanical biasing force exceeds the torque applied by the motor, then the controlled device moves toward its closed position. Similarly, when the torque applied by the motor exceeds the mechanical biasing force, then the controlled device is motivated toward its fully open position. The controlled device may be maintained in an intermediate position by balancing the electrically operative torque applied by the motor with the mechanical biasing forcing.

Unfortunately, a number of shortcomings persist when such mechanically operated torque motors are used, particularly in precision control applications. One problem arises from the variable torque applied by the mechanical bias to the motor shaft, since the return force of a spring, for example, varies with the extension of the spring. Therefore, as the spring or other mechanical biasing mechanism extends throughout the range of motion defined by the limit positions of the controlled device, the force or opposing torque applied against the motor shaft is known to vary. Accordingly, the motor controller must be designed to compensate for the varying torque applied against the motor shaft as the motor is driven to effect movement of the controlled device, which complicates the design and increases the cost of the controller.

Another shortcoming of this approach results from the variable torque of the mechanical biasing mechanism over the life of the device. A spring, for example, after being stretched and relaxed a number of times, will realize a change in its elasticity, thereby resulting in a corresponding change in the torque that opposes the motor torque. As this occurs, the controlled application suffers a decrease in efficiency. To more particularly describe this phenomenon, consider that the controller is generally designed to account for various factors such as the inertia of the motor, as well as the opposing force applied by the mechanical biasing mechanism. As this opposing force changes over time, a corresponding degradation in performance of the controller is realized.

A related shortcoming is noted in the variation in force applied by the mechanical biasing mechanism at various operating temperatures. That is, the elasticity, and therefore the torque, of the mechanical biasing mechanism is affected by temperature changes. While some temperature compensation can be designed into the controller, such an approach unduly complicates the controller design and elevates its cost.

Another shortcoming in mechanically biased motors is noted in the excessive power consumption, and the related problems of heat dissipation. The motor current draw, and therefore power consumption, must be sufficient to offset the opposing force of the return spring, which is a substantially constant value, notwithstanding the elasticity variations noted above. This constant offset current not only increases the motor operational costs, but also gives rise to heat dissipation concerns.

A further shortcoming of a mechanically biased motor is noted in its transient response. Where the particular controlled application requires a fast response time, mechanically operated torque motors are not a favored choice. Except for the elasticity variations noted above, the torque applied by the mechanical biasing means against the motor shaft is substantially constant. Therefore, a large mechanically applied bias force will result in a fast response time in the mechanically biased direction, but will result in a slower response in the opposing, motor driven direction. Similarly, a small mechanically applied force increases the response time in the opposing, motor driven direction, but will correspondingly decrease the response time in the mechanically biased direction. Accordingly, the chosen biasing mechanism it typically selected by a compromise to realize moderate performance and efficiency in both directions.

Stepper motors provide an alternative motor design sometimes utilized in bi-directional motor applications. While stepper motors generally have a relatively simple digital or pulsed controller design, their performance is belied by the discontinuous rotation of the motor shaft in discrete increments, rather than a uniform rotation. Accordingly, stepper motors typically provide an unsatisfactory solution for applications that demand high-precision continuous movement of the controlled device. High resolution stepper motors are known, however, to provide a fine step resolution, but are very expensive and thus usually cost prohibitive. Additionally, the drive circuitry for stepper motors is generally more complex and therefore expensive to operate over a wide range of operating conditions—e.g., voltage, current, temperature, position resolution, etc.

A further shortcoming in the prior art is noted in analog control circuits directed to control mechanical torque motors. Specifically, analog control circuits are generally more complex and expensive than their digital counterparts.

In addition analog controllers are more sensitive to temperature changes. Although they can be designed to operate effectively over a desired temperature range, such an approach complicates the design and elevates the controller cost.

SUMMARY OF THE INVENTION

Accordingly, it is a primary aim of the present invention to provide a limited angle torque motor and control circuit utilizing digital control of motor current balance to effect precise control of a controlled device.

Another object of the present invention is to provide an all-electronic limited angle torque motor and control circuit.

Another object of the present invention is to provide such a bidirectional limited angle torque motor and control circuit that realize efficient operation throughout the lifetime of the motor.

Another object of the present invention is to provide a bidirectional limited angle torque motor and control circuit that realize efficient operation over a wide range of operating temperatures.

A further object of the present invention is to provide a bidirectional limited angle torque motor and control circuit that achieve efficient control and operation of a controlled device throughout the entire range of controlled movement.

Still another object of the present invention is to provide a torque motor and control circuit having a simple, low-cost design.

Yet another object of the present invention is to provide a digitally controlled bidirectional motor and control circuit providing continuous or uniform rotational movement of the motor shaft and thus the controlled device.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, the present invention is generally directed to a limited angle torque motor and control circuit adapted to convert an electrical demand signal of varying magnitude into a motor shaft position relating to the magnitude of the demand signal. More particularly, a bidirectional motor is provided having two stator coils wound in phase opposition, so that the torques produced by the currents in the oppossedly wound coils are summed such that the coil having the greater current controls the direction of rotor rotation. A position sensing means is provided for producing a shaft position signal having a magnitude indicative of motor shaft position. Finally, an electronic control circuit is provided which is responsive to both the demand signal and the shaft position signal. The control circuit has two outputs for simultaneously driving the current in each respective stator coil. A modulator, included within the control circuit, produces a differential between the two control circuit outputs that cause the motor to rotate to the desired shaft position.

Having summarized the present invention, attention will now be directed briefly to preferred embodiments of the present invention. Specifically, in the preferred embodiment of the present invention the modulator is configured to reciprocally drive the currents in the respective stator coils.

That is, as the current through one coil is increased, a corresponding reduction in current applied to the other coil is applied. In this embodiment an extremely fast transient response is achieved. In an alternative embodiment, the modulator is configured to provide two outputs, whereby one output provides a substantially constant current to one stator coil to effectively act as a return spring, while the other output provides a varying current to the other coil for active motor control. The operation of this embodiment resembles that of mechanical torque motors insofar as it balances a controllable force against a fixed force, but the electronically controlled bias torque overcomes torque variance problems associated with mechanical torque motors.

BRIEF DESCRIPTION OF THE DRAWINGS

The accompanying drawings incorporated in and forming a part of the specification, illustrate several aspects of the present invention, and together with the description serve to explain the principles of the invention. In the drawings.

Reference will now be made in detail to various present preferred embodiments of the invention, examples of which are illustrated in the accompanying drawings.

DETAILED DESCRIPTION OF THE PREFERRED EMBODIMENTS

Figure 1:
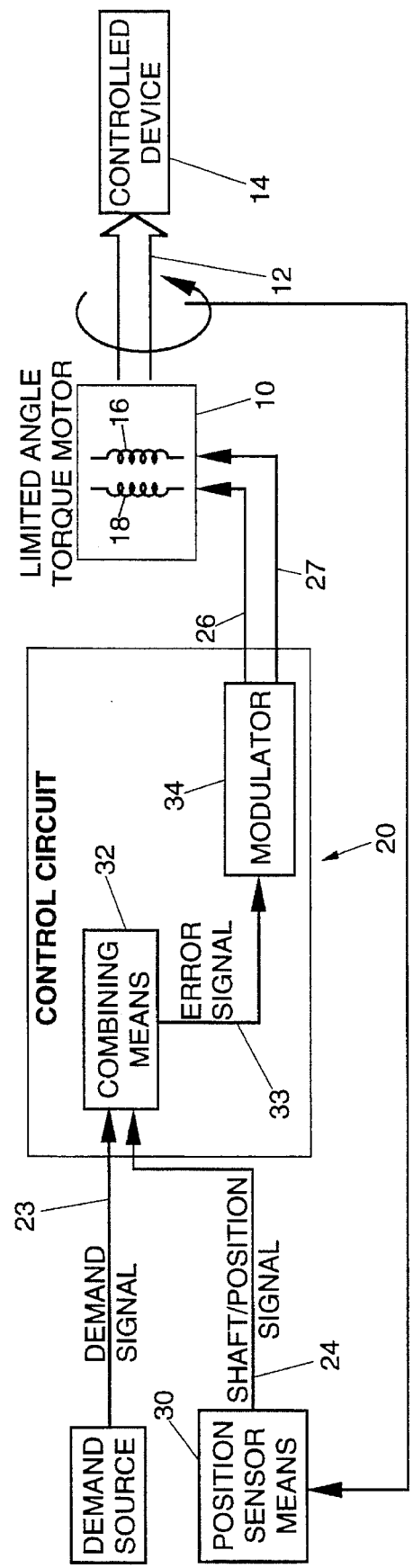
FIG. 1 is a block diagram illustrating the motor and control circuit of the present invention.

FIG. 1 shows a block diagram of a limited angle torque motor and control circuit. More particularly, a limited angle torque motor 10 having a motor shaft 12 is coupled to a controlled device 14, such as a fuel valve performing a speed control application in a combustion engine (not shown). The motor shaft 12 is coupled to the fuel valve 14 so that rotation of the motor shaft 12 imparts a similar rotation or movement to the fuel valve 14. In such a speed control application, the motor 10 is typically configured to rotate the fuel valve 14 between two fixed limit positions: a fully closed position and a fully open position. When in the fully closed position, fuel flow to the engine is shut off, thereby shutting down the engine. When in the fully open position, fuel flow to the engine is at a maximum, whereby the engine runs at maximum speed. The control circuit of the present invention is configured to effect precise control of motor shaft 12, and therefore the fuel valve 14, at all points between the limit positions so as to achieve precision speed control of the engine.

An important aspect of the present invention relates to the driving electromagnetics of the limited angle torque motor. Specifically, a bidirectional motor 10 is utilized to operate the controlled device 14. At least two stator coils 16, 18 are wound in phase opposition, whereby the respective torques resulting from the current passing through each stator coil are effectively summed. When the coil currents are equal, the motor 10 will remain in a locked-rotor position and the shaft 12 will hold in its current position. When, however, the current of either coil exceeds that of the opposing coil, then shaft 12 rotation will occur in the direction urged by the stator coil having the greater current.

More specifically, the preferred motor has a bifilar wound coil, which is wound by an automatic winding machine. The driver outputs from the control circuit are connected in opposing polarity across the bifilar windings, so that positively directed current from each driver will result in opposing torques within the motor. In this way, the motor coils may be described as being wound in polar or phase opposition, albeit physically wound together. In addition to simplifying the winding process, a substantial advantage of the bifilar wound coil is that it provides for substantially equal, opposing torques, when an equal current passes through each winding.

It should be appreciated that, consistent with the teachings of the present invention, the motor 10 may be a conventional DC motor (configured with phase opposing coils) having any number of stator poles and, similarly, can have additional stator coils, so long as coils are opposedly wound to achieve the torque summation described above. For example, the motor 10 may be an eight pole, four coil motor, in which two stator coils are wound in one direction and the other two are wound in the opposing direction. Preferably, however, the motor 10 of the present invention is a 4 pole motor, having a single bifilar wound stator coil.

Figure 4A:
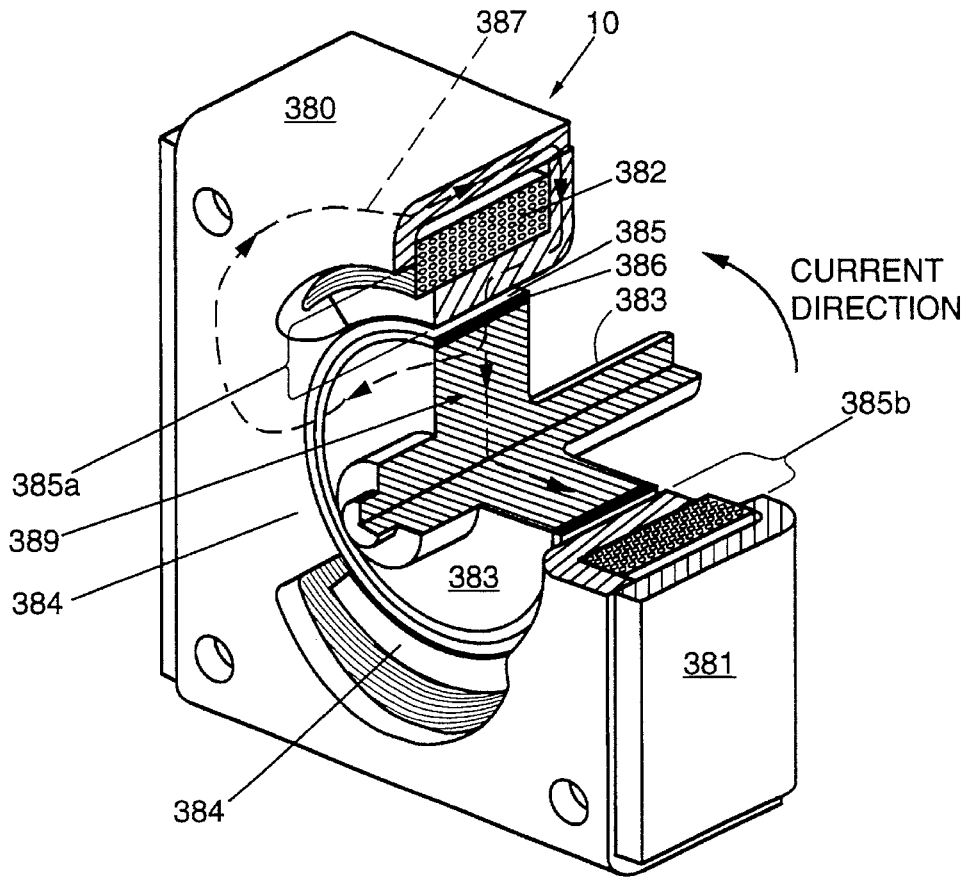
FIG. 4A is a perspective view of the preferred motor of the present invention, showing a partial cut-away.
Figure 4B:
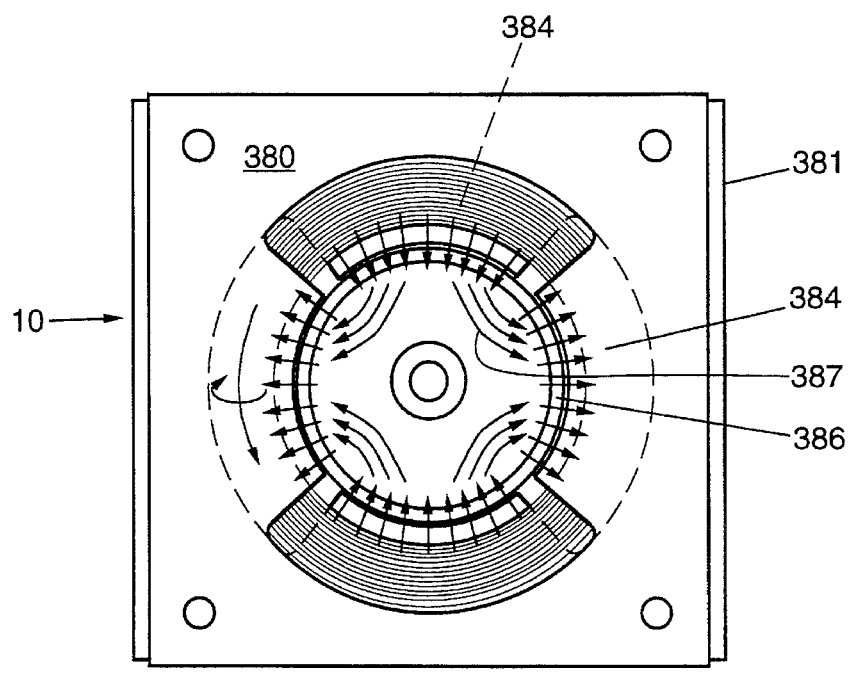
FIG. 4B is an elevational view of the motor shown in FIG. 4A, the view taken along the axis of the motor shaft, showing the stator pole configuration.

FIGS. 4A and 4B show the motor of the preferred embodiment of the present invention. The motor 10 is primarily constructed of two stator halves 380 and 381, and a coil 382 that is circumferentially wound (bifilar) about a centrally disposed rotor assembly 383, which includes a ring magnetic 386 having four radially oriented poles—e.g., alternating north and south poles spaced in 90 degree intervals. The stator halves 380 and 381 cooperate to form four stator poles 384, each of which substantially encircle the coil 382. Significantly, however, a small break or gap 385 is provided at each pole and serves to direct the path of magnetic flux so as to insure controlled rotary movement of the rotor 383. Furthermore, the poles 384 are formed so that two of the gaps 385a are disposed on one side of the motor 10 and the other two gaps 385b are disposed on the opposite side of the motor 10. This type of motor configuration is known as a Lundell motor.

To describe how controlled rotor rotation is achieved, magnetic flux lines 387 are shown in dashed lines in FIG. 4A, and in solid line in FIG. 4B. For purposes of the illustrated flux lines, only one coil current is considered, and is illustrated as passing through the coil in a counter-clockwise direction. Pursuant to the right-hand-rule, magnetic flux tends to encircle the coil by following the path of least reluctance. Largely, this least reluctance path for flux 387 is the path formed by the portion of the stator that immediately surrounds the coil 382. The gap 385, however, introduces a high reluctance area, interrupting the otherwise uniformly directed flux 387. As a result, the flux path crosses the air gap separating the stator 380, 381 and rotor 383. Within the rotor 383, the flux path splits 389, traveling 90 degrees in each direction, and again crosses the air gap (at the stator poles) back to the stator assembly. It then travels back through the stator half 380 (as illustrated) to complete the closed-loop path. In the illustrated embodiment, only one complete flux path is shown. It is understood, however, that four distinct flux paths (i.e., one for each pole) are induced by the single coil current.

Magnetic flux traveling in the direction from the stator to the rotor results in a stator pole of north polarity. Similarly, flux traveling in the direction from the rotor to the stator (return paths) results in a stator pole of south polarity (See FIG. 4B). It can be appreciated that, due to the alternating arrangement of the stator poles 384, current traveling through the coil as illustrated will result in alternating north and south stator poles. Consequently, the charged polarities on the ring magnet 386 that is sleeved on the rotor 383 will tend to rotate into alignment with the opposite polarities of the stator poles 384. Although not illustrated, it is understood that current traveling in the opposite direction through the bifilar wound coil induces four distinct magnetic flux paths in the opposite direction. When the currents are equal, the respective fluxes cancel out and no rotation of the rotor 383 is achieved. When, however, either current is greater than the other, rotary movement in the direction controlled by the larger current will result.

In keeping with the description of FIG. 1, a control circuit 20 provides the driving currents for stator coils 16, 18. Broadly, the control circuit 20 responds to a demand signal 23 and a shaft position feedback signal 24 to generate stator drive signals 26, 27 that are electrically connected to stator coils 16, 18. The demand signal 23 may be derived, for example, from a throttle (not shown) which may in turn be operated either manually or automatically, depending upon the application. The shaft position feedback signal 24 is derived from a position sensor 30, which may be disposed to detect either the position of the motor shaft, or alternatively the position of the controlled device 14, since determination of either may be used to provide the desired information to the control circuit 20.

The demand signal 23 and shaft position signal 24, which are level but continuously variable signals, are input into a combining means 32, such as a summer circuit, which combines the two signals to derive an error signal 33. The error signal in turn is input into a modulator 34 that produces the stator drive signals 26, 27. Broadly, the modulator 34 operates to control the differential between drive signals 26 and 27 to achieve desired motor control. When the drive signals 26 and 27 are matched by the modulator 34, then the motor 10 is held in a locked rotor position. When the motor is intended to rotate in one direction or the other, the modulator 34 mismatches the signals, with the magnitude or degree of mismatch controlling the net torque applied to the motor.

In the preferred embodiment, the modulator 34 generates drive signals 26 and 27 which are oscillatory signals. Preferably, the signals 26, 27 are digital signals having controlled high and low intervals that produce drive currents in the respective stator coils 16, 18, which are proportional to the duty cycle of the signals 26, 27—e.g., pulse width modulated control.

By way of illustration, assume that at some time t1 the motor 10 and control circuit 20 are at a steady state and the motor shaft 12 is in a locked rotor position, holding the fuel valve 14 in a position P1. At time t2, an operator moves a throttle position so as to demand an accelerated engine speed that will be attained by opening the fuel valve 14 to a position P2. Since the demand signal 23 demanding the P2 position is different than the position signal 24 which reflects the P1 position, an error signal 33 will be produced to reflect that mismatch. The error signal 33 is input to modulator 34, which in turn will produce a modulated differential signal on lines 26 and 27 that cause the motor shaft 12 and therefore the fuel valve 14 to rotate toward the desired P2 position. As the fuel valve approaches the desired position and the position signal 24 approaches the demand signal 23, the magnitude of the error signal 33 will continually decrease, reaching zero when the fuel valve 14 reaches the desired P2 position, and the system will again be at a steady-state.

Figure 2A:
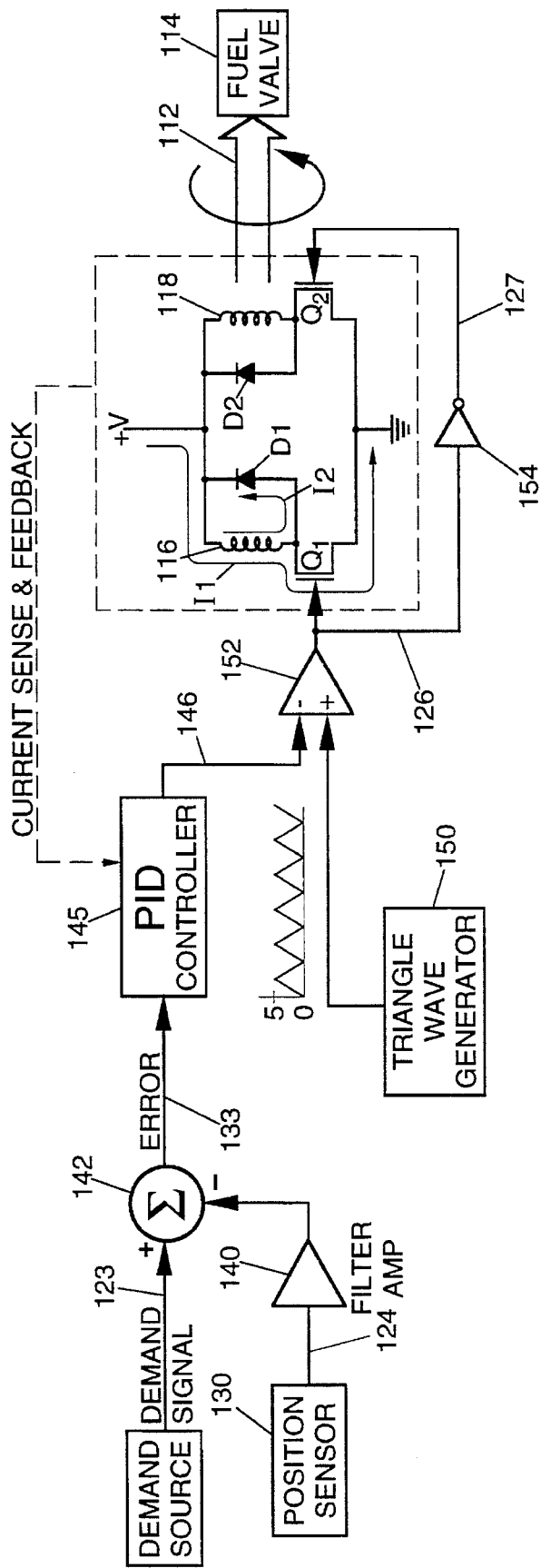
FIG. 2A is a block diagram illustrating the motor and control circuit of the preferred embodiment of the present invention.

Turning now to FIG. 2A, the preferred embodiment of the motor and control circuit of the present invention is shown. A dual-wound, bidirectional limited angle torque motor 110, as describe in connection with FIG. 1, is disposed to rotate a motor shaft 112. In the illustrated embodiment, the motor is connected to operate a fuel valve 114 in a speed control application. Broadly, the embodiment shown in FIG. 2A operates in the same fashion as described in connection with FIG. 1, with more detail being presented in connection with the control circuit 120 of FIG. 2A.

More particularly, the position signal 124 is conditioned by filter/amplifier 140 and combined with the demand signal 123 by summer 142. The resulting error signal 133 is input to a coupling means, which is preferably a proportional-integral-derivative (PID) controller 145. As known in the art, a PID controller 145 has a plurality of separate compensation terms, including at least one proportional term, at least one integral term, and at least one derivative term. The proportional term provides a compensation component that is based upon the magnitude of the discrepancy between the demand signal 123 and the shaft position feedback signal 124—i.e., error signal 133. Thus, for example, when the error signal 133 is relatively large a relatively large proportional compensation term will be generated.

In a similar fashion, the integral term provides a compensation component that is based upon position error over time. If the integration reveals that the desired position has, for a period of time (the demand period set by the integrator), either led or lagged the actual shaft position, then the integral term will provide an appropriate compensation component.

The derivative term provides an anticipatory compensation component. Specifically, the derivative term is derived by computing the change in the error signal. In some instances, particularly when the error signal is very large reflecting a large differential between the desired and actual motor shaft 112 position, it is desirable for this differential to be reduced at a very fast rate, as would be commanded by the proportional term. When, however, the error signal is very small, a high rate of change would likely result in a large overshoot, and is therefore undesirable. The derivative compensation component thus provides such an anticipatory term, and advantageously affects the motor compensation to achieve a desired controlled response.

It is appreciated that additional PID compensation terms may be provided. For example, additional proportional, integral, and/or derivative terms may be included where appropriate to achieve improved motor control and performance. Furthermore, the individual PID compensation terms are weighted in part in accordance with various motor parameters so as to achieve a desired, controlled response. As was previously described, the proportional compensation term, for example, increases as the error signal increases. The actual amount (i.e., weighting) of the proportional term, however, for a given error signal is dependent upon various motor parameters, such as motor inertia, transient response, etc. Integral and derivative compensation components are similarly weighted. It may also be desired to sense the current passing through the stator coils 116 and 118, and feed these current values back as yet another input to the PID controller (as illustrated in dashed lines in FIGS. 2A and 3).

For any given family (i.e., model) of motors, the control circuit is "tuned" to that motor by setting the weighting parameters of the PID compensation terms. In the preferred embodiment, a number of motors of the same model are individually tested over a range of temperature, voltage, varied line lengths, etc., and in each instance the PID weighting parameters are varied to achieve optimum performance for that particular motor. The weighting terms derived from these individual tests are then averaged to derive a nominal set of compensation terms that are used for that particular family of motors. This provides for ready interchangeability of motors and control circuits within a given family, without having to individually tune each and every production unit.

In keeping with the description of FIG. 2A, the PID controller 145 has a nonoscillatory output 146, which is preferably in the range of zero to five volts. This output 146 is input to a modulator 134, which includes a triangle wave generator 150 and a comparator 152 that effect pulse width modulation of stator coil drive currents. More particularly, the triangle wave generator 150 produces a triangular waveform that oscillates between zero and five volts. This oscillatory signal is input to the comparator 152 to modulate the output 146 of the PID controller 145. Consistent with the teachings of the present invention, a sawtooth or other waveform generator could be used, so long as the duty cycle of the modulator output is controllably affected by the magnitude of the input.

In one embodiment and as illustrated schematically in the figures, the control circuit of the present invention may be implemented with analog components. In an alternative embodiment, however, the operation of the illustrated embodiment is conducted under digitally programmed control. That is, the operation of the summer 132 and PID controller 145 are carried out digitally, for example, under microprocessor control. Indeed, the operation of the modulator 124 may be carried out under digital control. The modulator output signals 126, 127, then, may be generated by timer circuits as known in the art. In such a digital embodiment, the signal values such as the PID output 146, that are illustrated as ranging from zero to five volts, are actually binary representations of an equivalent analog signal level.

Figure 2B:
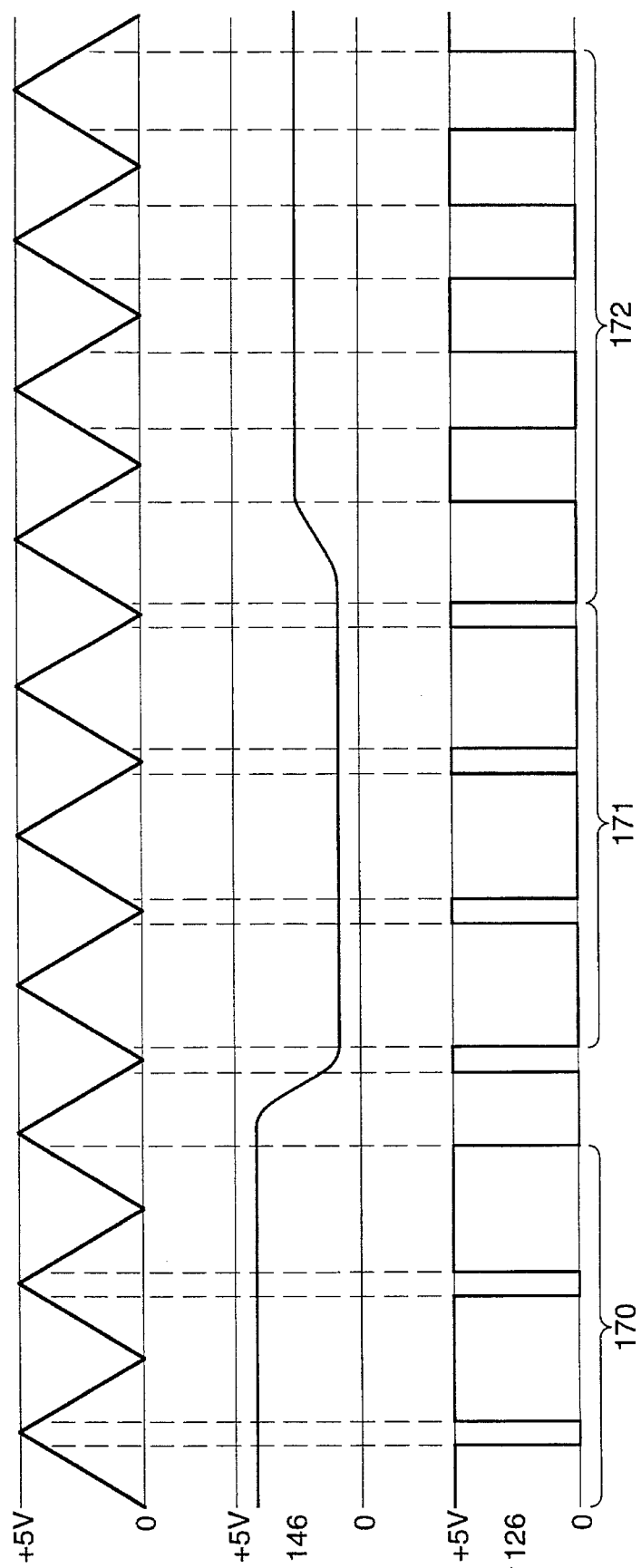
FIG. 2B is a graph showing waveforms associated with the modulator shown in FIG. 2.

FIG. 2B shows waveforms associated with the modulator 134 for the embodiment shown in FIG. 2A. Specifically, the waveform show on the first line is the triangular waveform produced by the triangle wave generator 150. The waveform on the second line is a hypothetical waveform output from the PID controller on 146. Finally, the waveform on the third line is the waveform that would be output from comparator 152 on line 126, based upon the waveforms shown on the first two lines. Each waveform has a value between zero and five volts.

As is understood by those skilled in the art, the comparator operates as follows: when the value of the input to the comparator's 152 positive terminal (PID output 146) exceeds the value of the input on the comparator's 152 negative terminal (triangular waveform), the output of the comparator will be five volts or a logic "1". Conversely, when the value of the signal input to the comparator's 152 negative terminal exceeds the input to the positive terminal, the output of the comparator 152 will be zero volts or a logic "0". As configured to operate in the circuit of FIG. 2A, the comparator 152 effectively varies the duty cycle of stator drive signal 126—e.g., pulse width modulates. As shown by the example presented in FIG. 2B, when the output 146 from the PID controller 145 is greater than 2.5 volts (range 170), then the duty cycle of drive signal 126 is greater than fifty percent. When the output 146 from the PID controller 145 is less than 2.5 volts (range 171), then the duty cycle of signal 126 is less than fifty percent. Finally, when the PID output 146 is 2.5 volts (range 172), then the duty cycle of signal 126 is fifty percent. As will be described in more detail immediately below, when the duty cycle of signal 126 is greater than fifty percent the motor shaft 112 is rotated in one direction; when the duty cycle of 126 is less than fifty percent the motor shaft 112 is rotated in the other direction; and when the duty cycle of 126 is fifty percent, the motor 110 in maintained in a locked rotor position, and the fuel valve 114 is held in position.

The output 126 of comparator 152 is connected directly to the gate of FET Q1, and also to inverter 154, the output 127 of which is connected to the gate of FET Q2. The drain of each FET Q1, Q2 is connected to ground, and the source of each FET Q1, Q2 is connected through stator coils 116 and 118 to a voltage source +V, which may be a battery. The FETs Q1, Q2 are selected to provide sufficient current flow through the stator coils 116, 118 to drive the motor 110. As ensured by inverter 154, the oscillatory signals 126 and 127 are in phase opposition, so that when the duty cycle of one is greater than fifty percent, the duty cycle of the other is less than fifty percent, providing a faster controlled response. In the manner described above, the FETs Q1 and Q2 combine to provide driver circuitry for driving the motor.

Flyback diodes D1 and D2 provide a return path for the current through each stator winding. When Q1 is closed, for example, current flows from +V through stator coil 116 and FET Q1 to ground, as illustrated by I1. When Q1 opens and the magnetic field established in coil 116 collapses, the voltage across the terminals of coil 116 inverts, resulting in a current loop through the coil 116 and diode D1, as illustrated by I2. Similar current paths are achieved by the coil 118, FET Q2, and Diode D2 arrangement. This circuit configuration provides desirable motor response by maintaining continuous current flow through coils 116 and 118, wherein the average current through the coils is proportionally related to the duty cycle of signals 126 and 127.

As previously mentioned, the motor 110 of the preferred embodiment is a bidirectional DC motor, adapted for limited rotation by the insertion of mechanical stops. Unlike conventional DC motors where the direction of rotor rotation is controlled by the direction or polarity of the current passing through the stator winding, the motor 110 of the present invention has coils wound in phase opposition, whereby rotor rotation results from flux summation or torque averaging. That is, current is simultaneously passing through both windings in phase opposing relation, so that the larger of the currents controls the direction of rotor rotation.

In the preferred embodiment, the motor 110 is driven in accordance with the oscillatory signals applied to the driver circuitry of Q1 and Q2. When the duty cycle of signals 126 and 127 are equal at fifty percent, an average current of substantially equal magnitude passes through each stator coil 116, 118. Since, however, the stator coils are wound in phase opposition, the respective torques resulting from the substantially equal currents cancel out and the rotor is held in a locked position. When the duty cycle of signal 126 is greater than fifty percent, the duty cycle of signal 127 is less than fifty percent, by virtue of inverter 154. Accordingly, the average current passing through coil 116 is greater that the average current passing through coil 118, resulting in motor rotation in one direction and therefore operating the fuel valve 114 in one direction. Similarly, when the duty cycle of signal 126 is less than fifty percent, the duty cycle of signal 127 will exceed fifty percent and the motor will rotate in the opposite direction, motivating the fuel valve in the opposite direction.

Figure 3:
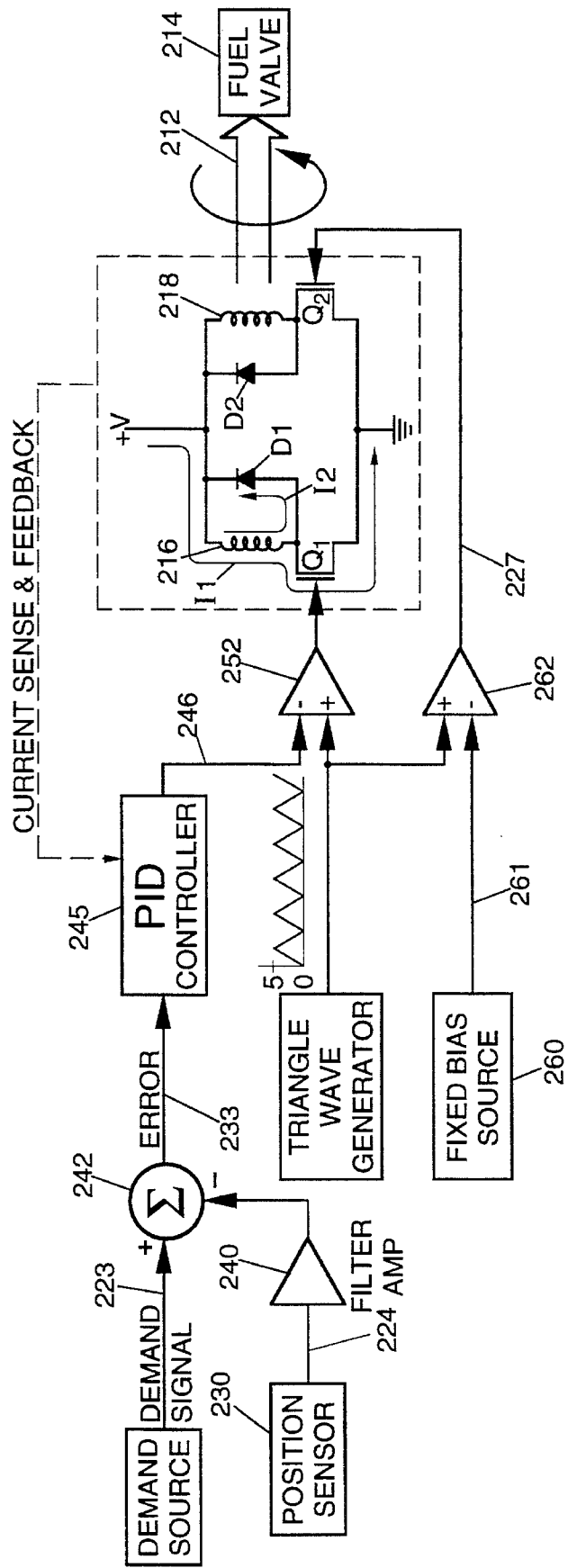
FIG. 3 is a block diagram illustrating the motor and control circuit of an alternative embodiment of the present invention.

Referring now to FIG. 3, an alternative embodiment of the motor and control circuit of the present invention is shown. The embodiment shown in FIG. 3 is similar to that shown and described in connection with FIG. 2A, with the differences being in the modulator 234 circuitry. The position sensor 230, filter 240, summer 242, PID controller 245, and motor 210 all operate in the same fashion as those same components described in FIG. 2A. The modulator 234, however, provides two separate channels for driving the motor 210.

Like the embodiment of FIG. 2A, input terminals of a first comparator 252 are electrically connected to the output 246 of the PID controller 245 and a triangle wave generator 250. A second comparator 262, however, is provided and has input terminals electrically connected to the triangle wave generator 250, and a fixed bias source 260. The fixed bias source 260 has a single, nonoscillatory output 261 which may be set between zero and five volts.

The second comparator 262 operates in the same fashion as the first comparator 252. Namely, it produces an oscillatory signal on 227 having a duty cycle that depends on the magnitude of the bias source output 161. This oscillatory signal, through FET Q2, provides a constant duty cycle on line 227 and thus a constant (average) current through stator coil 218, thereby providing a constant motor torque that opposes the torque established by stator coil 216. When the duty cycle of the signal 226 output from comparator 252 is less than the duty cycle of signal 227, then the average current through coil 216, and therefore the torque attributable to that coil, is less than that of coil 218 and the motor shaft 212 is rotated in a direction motivated by coil 218. Likewise, when the duty cycle of signal 226 is greater than that of signal 227, then the motor shaft is rotated in a direction motivated by coil 216.

It can be appreciated that the embodiment of FIG. 3 is similar to the mechanically operated torque motors described in the background, in the sense that the fixed bias source 260 applies a constant torque to the motor 210 in one direction like a spring or other mechanical bias. Unlike a mechanical torque motor, however, the amount of bias torque is constant for a given setting and may be conveniently adjusted by adjusting the magnitude of bias output 261. This may be accomplished, for example, by preprogramming a bias value as well as providing operator controls that allow run-time adjustment of a bias value.

In additional to the adjustable torque feature, the embodiment shown in FIG. 3 also has other performance and operational advantages over mechanically operated torque motors. For example, the all-electronic torque control does not degrade or otherwise change over time, as does the elasticity and therefore torque of mechanical torque motors. Similarly, the torque resulting from bias source 260 remains constant throughout the entire range of motor shaft 212 rotation, as opposed to the torque variation of mechanical torque motors. Furthermore, the control circuit of FIG. 3 is greatly simplified from the linear controllers often used to control and drive torque motors.

Temperature sensitivity is another advantage of the electronically supplied torque of the present invention over mechanical torque motors. As noted in the background the elasticity and therefore torque of mechanical biasing mechanisms of mechanically operated torque motors varies with temperature. The electronically supplied torque of the present invention does not suffer this same shortcoming, particularly where the operations of the PID controller 245, the bias source 260, and the summer 242 are all digitally performed.

Referring now collectively to FIGS. 2A and 3, the motor and controller of FIG. 3 is particularly suitable for applications in which a fast response time is not required. Although the embodiment of FIG. 3 enjoys substantial advantages over its mechanical torque motor counterparts, the transient response is similar to that of mechanical torque motors. The magnitude of the fixed bias source output 261 is chosen as a result of tradeoffs: as the magnitude is increased to provide greater torque for coil 218, the response time of the motor shaft 212 in the direction aided by coil 218 is reduced, but the response time when controlling coil 216 to rotate the motor shaft in the opposing direction is correspondingly increased.

The embodiment of FIG. 2A, however, provides an much faster transient response since both coils 116 and 118 are actively controlled by the control circuit 120. The inclusion of inverter 154 ensures that the torques are reciprocally applied so that as the torque to coil 116 is increased as the torque to coil 118 is reduced. The transient response achieved by the embodiment of FIG. 2A realizes a ten-fold improvement over mechanically operated torque motors. Specifically, empirical data reveals that typical mechanical torque motors achieve transient response of 300–400 milliseconds, whereas the motor and controller of FIG. 2A achieve response times of 30–40 milliseconds.

The foregoing description of various preferred embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A limited angle torque motor and control circuit for converting an electrical demand signal of varying magnitude into a motor shaft position relating to the magnitude of the demand signal, comprising in combination:

a bidirectional motor having at least two stator coils wound in phase opposition so that torques produced by currents flowing in the opposedly wound coils are summed such that the coil having the greater current controls the direction of rotor rotation;

means for producing a shaft position signal having a magnitude indicative of motor shaft position; and an electronic control circuit responsive to the demand signal and the shaft position signal and having two outputs for concurrently controlling the currents flowing in the respective stator coils, the control circuit including a modulator for producing a differential between the two outputs adequate to cause the motor shaft to rotate to the desired shaft position.

2. The limited angle torque motor and control circuit according to claim 1, wherein the modulator produces digital outputs having respective duty cycles which establish the current flow in the respective motor stator coils.

3. The limited angle torque motor and control circuit according to claim 2, wherein the control circuit includes summing means for combining the demand signal and the shaft position signal to produce an error signal and means for coupling the error signal to the modulator for controlling the differential in response to the error signal.

4. The limited angle torque motor and control circuit according to claim 3, wherein the modulator includes a comparator having two inputs, a first input carrying a cyclic signal, the second input being the error signal, the comparator having a digital level output which switches at about the point where the magnitude of the cyclic signal passes the magnitude of the error signal to produce a digital output having a period representative of the period of the cyclic signal and a duty cycle representative of the magnitude of the error signal.

5. The limited angle torque motor and control circuit according to claim 4, wherein the modulator includes an invertor disposed so that the modulator outputs are inversely related digital level signals.

6. The limited angle torque motor and control circuit according to claim 4, wherein the modulator includes a second comparator having two inputs, the first input carrying a cyclic signal and the second input connected to a fixed bias source, the comparator having a digital level output which switches at about the point where the magnitude of the cyclic signal passes the magnitude of the error signal to produce a digital output having a period representative of the period of the cyclic signal and a duty cycle representative of the magnitude of the error signal.

7. The limited angle torque motor and control circuit according to claim 6, wherein the comparator outputs are the modulator outputs.

8. The limited angle torque motor and control circuit according to claim 3, wherein the coupling means includes a controller having a proportional, an integral, and a derivative control terms for modifying the error signal coupled to the modulator.

9. The limited angle torque motor and control circuit according to claim 8, wherein the control terms are weighted, the weighting being based upon motor parameters including motor inertia, so as to optimize the motor performance.

10. The limited angle torque motor and control circuit according to claim 1, wherein the stator coils are bifilar wound to match the torque characteristic of the phase opposed coil.

11. The limited angle torque motor and control circuit according to claim 2, further including a driver circuit interconnected between the modulator and the stator coils, whereby the driver circuit receives the outputs of the modulator and generates drive currents in the stator coils in response thereto.

12. A limited angle torque motor and control circuit for control of the motor comprising in combination:

a bidirectional motor having at least two stator coils wound in phase opposition so that torques produced by currents in the oppposedly wound coils are summed such that the coil having the greater current controls the direction of rotor rotation;

a source for producing a demand signal having a magnitude that is representative of a desired motor shaft position;

means for generating a feedback signal having a magnitude that is representative of the motor shaft position;

a summing circuit that combines the demand signal and the feedback signal to generate an error signal that represents a desired change in motor shaft position;

a modulator that is responsive to the error signal, the modulator operative to generate a varying output signal having a duty cycle that is determined by the error signal; and a driver circuit that receives the output of the modulator and generates drive currents in each of the stator coils, wherein one of the drive currents has a duty cycle substantially the same as the output of the modulator and the second drive current is in phase opposition to the first drive current;

whereby the drive currents combine in the motor to effect rotation of the motor shaft through an angle to the desired shaft position.

13. The limited angle torque motor and control circuit according to claim 12, wherein the modulator produces digital outputs having respective duty cycles which establish the current flow in the respective motor stator coils.

14. The limited angle torque motor and control circuit according to claim 13, wherein the motor shaft is held in locked rotor position when the duty cycle of the modulator output is about fifty percent.

15. The limited angle torque motor and control circuit according to claim 13, wherein the motor shaft is rotated in a first direction when the duty cycle of the modulator output is less than about fifty percent, and the motor shaft is rotated in the opposite direction when the duty cycle of the modulator output is greater than about fifty percent.

16. The limited angle torque motor and control circuit according to claim 15, wherein the driver circuit maintains a reciprocal relation between the current magnitudes in the stator coils, whereby the current in one stator coil is controlled to increase, as the current in the other stator coil is controlled to decrease.

17. A limited angle torque motor and control circuit for control of the motor comprising in combination:

a bidirectional motor having at least two stator coils wound in phase opposition so that torques produced by currents in the oppositely wound coils are summed such that the coil having the greater current controls the direction of rotor rotation;

a source for producing a demand signal having a magnitude that is representative of a desired motor shaft position;

means for generating a feedback signal having a magnitude that is representative of the motor shaft position;

means for producing a bias signal that is adapted to control the current in a first stator coil so as to generate a torque that tends to rotatably urge the motor shaft to a fixed limit position;

a summing circuit that combines the demand signal and the feedback signal to generate an error signal that represents a desired change in motor shaft position; and a modulator that is responsive to the error signal, the modulator operative to generate an oscillatory output signal having a duty cycle that is determined by the error signal, the modulator output signal adapted to control the current in a second, oppositely wound stator coil that generates a motor torque that opposes the torque generated by the first stator coil;

whereby the motor shaft rotates in a direction determined by the relative magnitudes of the stator coil currents, and remains in a locked position when the two currents are equal.

18. The limited angle torque motor and control circuit according to claim 17, further including a controller that is configured to generate an output signal having a magnitude that is related to the error signal.

19. The limited angle torque motor and control circuit according to claim 18, wherein the modulator produces digital outputs having respective duty cycles which establish the current flow in the respective motor stator coils.

20. The limited angle torque motor and control circuit according to claim 19, further including a driver circuit that receives both modulator output signals, the driver operative to generate a drive current in each stator coil that is determined by the duty cycle of the respective modulator output.

21. The limited angle torque motor and control circuit according to claim 20, wherein the bias signal may be adjusted so as to vary the bias torque applied to the motor.

* * * * *